United States Patent
Kobayashi et al.

(10) Patent No.: US 6,333,071 B1
(45) Date of Patent: Dec. 25, 2001

(54) METHOD AND APPARATUS FOR PRODUCING OPTICAL FIBER RIBBONS

(75) Inventors: Kohei Kobayashi; Ichiro Tsuchiya; Tomoyuki Hattori, all of Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/471,257

(22) Filed: Dec. 23, 1999

(30) Foreign Application Priority Data

Dec. 25, 1998 (JP) .................................... 10-376498

(51) Int. Cl.[7] ............... B32B 31/00; G02B 6/44
(52) U.S. Cl. ............ 427/163.2; 118/419; 118/420; 118/642; 156/166; 156/180; 385/114; 425/114; 427/434.2; 427/434.6
(58) Field of Search ............ 385/114; 427/163.2, 427/299, 434.6, 434.2; 425/114; 156/166, 180

(56) References Cited

U.S. PATENT DOCUMENTS 3,148,102 * 9/1964 Eakins et al. .................... 156/173

FOREIGN PATENT DOCUMENTS 63-161418-A * 7/1988 (JP) .
6-250057-A * 9/1994 (JP) .
10-142464-A * 5/1998 (JP) .

* cited by examiner

Primary Examiner—Jeff H. Aftergut
(74) Attorney, Agent, or Firm—McDermott, Will & Emery

(57) ABSTRACT

An apparatus for producing optical fiber ribbons which has a optical fiber gathering device, one or more coating applicators and a turn roller arranged in a straight line, with one or more alignment guide in plate form being provided on a travelling line of optical fibers or optical fiber ribbons upstream of the coating applicator. The alignment guide is chamfered to arch form on the side that contacts the optical fibers or the optical fiber ribbons. The alignment guide suppresses the optical fibers or the optical fiber ribbons from vibrating in a direction perpendicular to the direction of the arrangement of the optical fibers or the optical fiber ribbons.

9 Claims, 6 Drawing Sheets $t_2$ : OFFSET OF SECOND OPTICAL FIBER
$t_3$ : OFFSET OF THIRD OPTICAL FIBER

METHOD AND APPARATUS FOR PRODUCING OPTICAL FIBER RIBBONS

BACKGROUND OF THE INVENTION

1. Field of the Invention

The present invention relates to improved methods for manufacturing optical fiber ribbons that are produced by arranging optical fibers side by side in the same plane and coating them with a coating resin integrally, as well as a separable optical fiber ribbon that is produced by arranging the optical fiber ribbons side by side in the same plane and coating them integrally with a coating resin.

The present invention particularly relates to an alignment guide having a special structure that is adapted to produce optical fiber ribbons and a separable optical fiber ribbon thereof by a stable and uniform coating operation. The present invention also relates to an improved apparatus and method for producing optical fiber ribbons and a separable optical fiber ribbon thereof using the alignment guide.

2. Description of the Related Art

FIGS. 6A and 6B are schematic views of a conventional art mechanism for aligning optical fibers in producing an optical fiber ribbon.

FIGS. 7A and 7B are schematic views of another conventional art mechanism for aligning optical fibers in producing an optical fiber ribbon.

In FIGS. 6A to 7B, numeral 40 represents an optical fiber; 41, an optical fiber supply unit; 42, a coating applicator; 43, an optical fiber; 44, an optical fiber gathering device; 45, optical fiber gathering rollers; 46, a groove; 47, an alignment guide roller; 48, a concave; 49, a supply bobbin; 50, a curing device and 51, a turn roller.

As shown in FIGS. 6A and 6B, Unexamined Published Japanese Patent Application (kokai) No. Hei. 10-142464 discloses that a plurality of optical fibers 43 are passed through the optical fiber gathering device 44 consisting of optical fiber gathering rollers 45 each having a groove 46 in the rim. As a result, the individual optical fibers are spaced apart in a plane without problems such as irregularities in optical fiber arrangement and damage to optical fibers.

In this case, because of the existence of the coating applicator 42, the distance between the optical fiber gathering device 44 composed of rollers 45 with the grooves 46 spaced apart and the turn roller 51 cannot generally be made short enough to ensure suppression of vibrations of optical fibers, which tends to cause "planer eccentricity" as defined later.

As shown in FIGS. 7A and 7B, Examined Published Japanese Patent Application (kokoku) No. 8-33507 discloses that an optical fiber aligning apparatus is adapted to have a vertical pass line and optical fibers 40 are aligned with a plurality of alignment guide rollers 47 each having the concave 48 in the rim. In the case shown in FIG. 7A, three of such alignment guide rollers are provided at different positions in contact with optical fibers.

The apparatus has a disadvantage that each alignment guide roller 47 tends to costrain all optical fibers laterally toward the center thereof, thereby causing the optical fibers to contact each other.

If adjacent optical fibers contact each other before they enter the coating applicator 42, mutual friction develops to increase the chance of the occurrence of vibrations. If the individual optical fibers 40 are not sufficiently wound onto the alignment guide rollers 47 but are placed in partial contact with them, one of the optical fibers before they are integrated into a fiber ribbon is likely to be subjected to a great torque causing the alignment guide rollers 47 to rotate. As a result, the tension on that particular optical fiber 40 increases under reaction force but the force is not stable, therefore the optical fiber is likely to vibrate.

The upset in the balance among the tensions on the individual optical fibers 40 also causes differences in length between the optical fibers 43 and otherwise deteriorates their characteristics.

SUMMARY OF THE INVENTION

The present inventors made intensive studies in order to solve the aforementioned problems of the conventional arts and came up with providing an alignment guide of a special structure in a pass line upstream of a coating applicator. It has been found that even if self-centering force to which optical fibers or optical fiber ribbons are subjected as they pass through a die decrease, the alignment guide helps suppress the optical fibers from vibrating in a direction perpendicular to the direction of their arrangement as they travel from the optical fiber gathering device toward the turn roller so that the optical fibers or optical fiber ribbons can be arranged uniformly in a plane. The present invention has been accomplished on the basis of this finding.

An apparatus for producing an optical fiber ribbon or a separable optical fiber ribbon according to the present invention has an optical fiber gathering device, one or more coating applicators and a turn roller, all of which are arranged in a straight line, and further has at least one alignment guide in plate form provided upstream of each coating applicator, the alignment guide being chamfered to arch form on the side that contacts optical fibers or optical fiber ribbons and the alignment guide suppressing the optical fibers or the optical fiber ribbons from vibrating in a direction perpendicular to the direction of their arrangement.

In the apparatus, the alignment guide in plate form preferably has a diamond film coated on the surface area that contacts the optical fibers or the optical fiber ribbons.

In the apparatus, a mechanism is preferably further provided for retracting the alignment guide in plate form such that the alignment guide can come out of the travelling line of the optical fibers or the optical fiber ribbons.

The present invention provides a method of producing optical fiber ribbons by means of any of the apparatus described above, with the alignment guide in plate form being used to suppress the vibrations occurring in the direction perpendicular to the direction in which the optical fibers are arranged.

In the method, the alignment guide in plate form is situated on the pass line during operation at a low line-speed but retracted from the pass line in a high-speed operation.

In the method, the alignment guide is preferably situated on the pass line when the line-speed is less than 2 m/sec.

BRIEF DESCRIPTION OF THE DRAWINGS

In the accompanying drawings:

FIGS. 1A and 1B are schematic cross-sectional views of two examples of optical fiber ribbons, in which FIG. 1A shows a 4-fiber optical fiber ribbon, and FIG. 1*b* shows a separable optical fiber ribbon in which eight optical fibers are arranged;

PREFERRED EMBODIMENT OF THE INVENTION

Preferred embodiments of the invention are described below with reference to FIGS. 1 to 5.

[I] Structures of Optical Fiber Ribbons

Figure 1A:
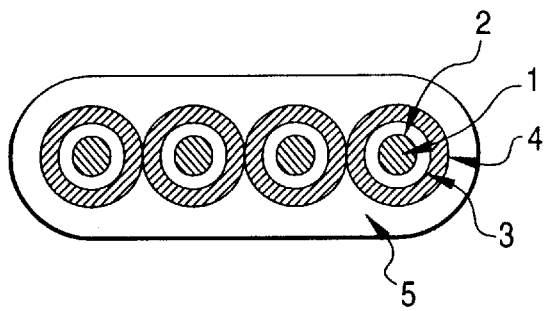
Figure 1B:
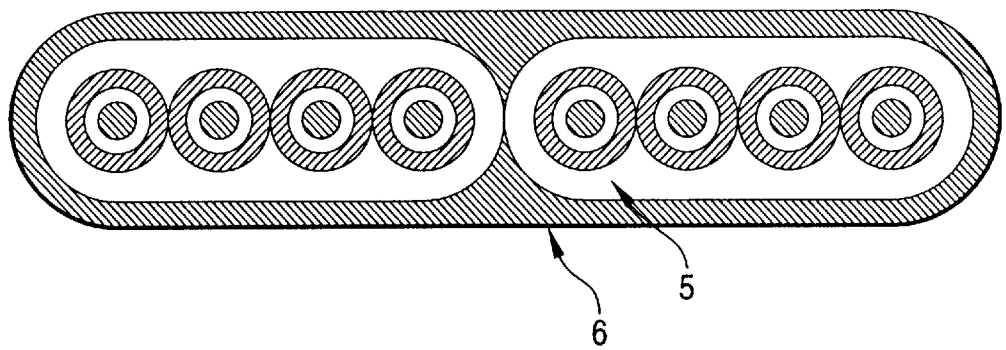

FIGS. 1A and 1B are schematic cross-sectional views of two examples of optical fiber ribbons. FIG. 1A shows a 4-fiber optical fiber ribbon, and FIG. 1b shows a separable optical fiber ribbon in which eight optical fibers are arranged.

In FIGS. 1A and 1B, reference numeral 1 represents a glass optical fiber; 2, an inner protective coating; 3, an outer protective coating; and 4, a colored resin layer. An optical fiber consisting of these components corresponds to 11 in FIG. 2 and a plurality of such optical fibers are further integrally coated with an inner coating layer 5 to form a optical fiber ribbon. Two of such optical fiber ribbons are further integrally coated with an outer coating layer 6 to form separable optical fiber ribbons.

In either type of optical fiber ribbons, a plurality of optical fibers 11 typically having a diameter of 250 µm are arranged in a straight row. The 4-fiber optical fiber ribbon is made by applying a coating layer 5 on the optical fibers in one operation. The separable optical fiber ribbon is made by first applying an inner coating layer 5 on the optical fibers and then applying an outer coating layer 6 on the 4-fiber optical fiber ribbons in one operation.

UV curable resins such as urethane acrylates/urethane methacrylates, ester acrylates/ester methacrylates and epoxy acrylate/epoxy methacrylates are preferably used to further coat the optical fibers or optical fiber ribbons integrally.

Figure 2:
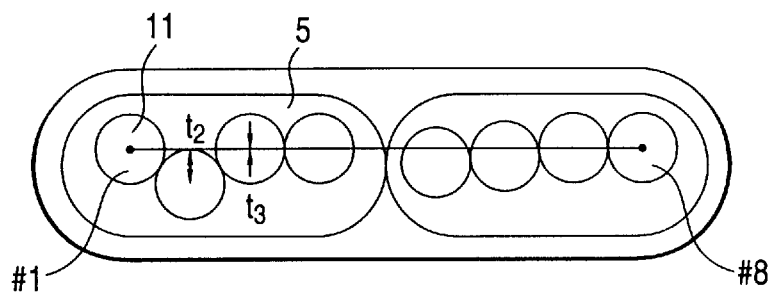
FIG. 2 is a schematic cross-sectional view of a separable optical fiber ribbon, which is referenced for defining "planar eccentricity"

FIG. 2 is a schematic cross-sectional view of a separable optical fiber ribbon, which is referenced for defining "planar eccentricity". The term "planar eccentricity" as used in the present invention means a distance between the center of each optical fiber and the straight line connecting the centers of the two optical fibers at the outermost in an optical fiber ribbon.

In FIG. 2, reference numeral 11 represents an optical fiber; 5, an inner coating layer; 6, an outer coating layer; $t_2$, the planar eccentricity of the second optical fiber; and $t_3$, the planar eccentricity of the third optical fiber.

[II] Manufacturing Optical Fiber ribbons

Figure 3A:
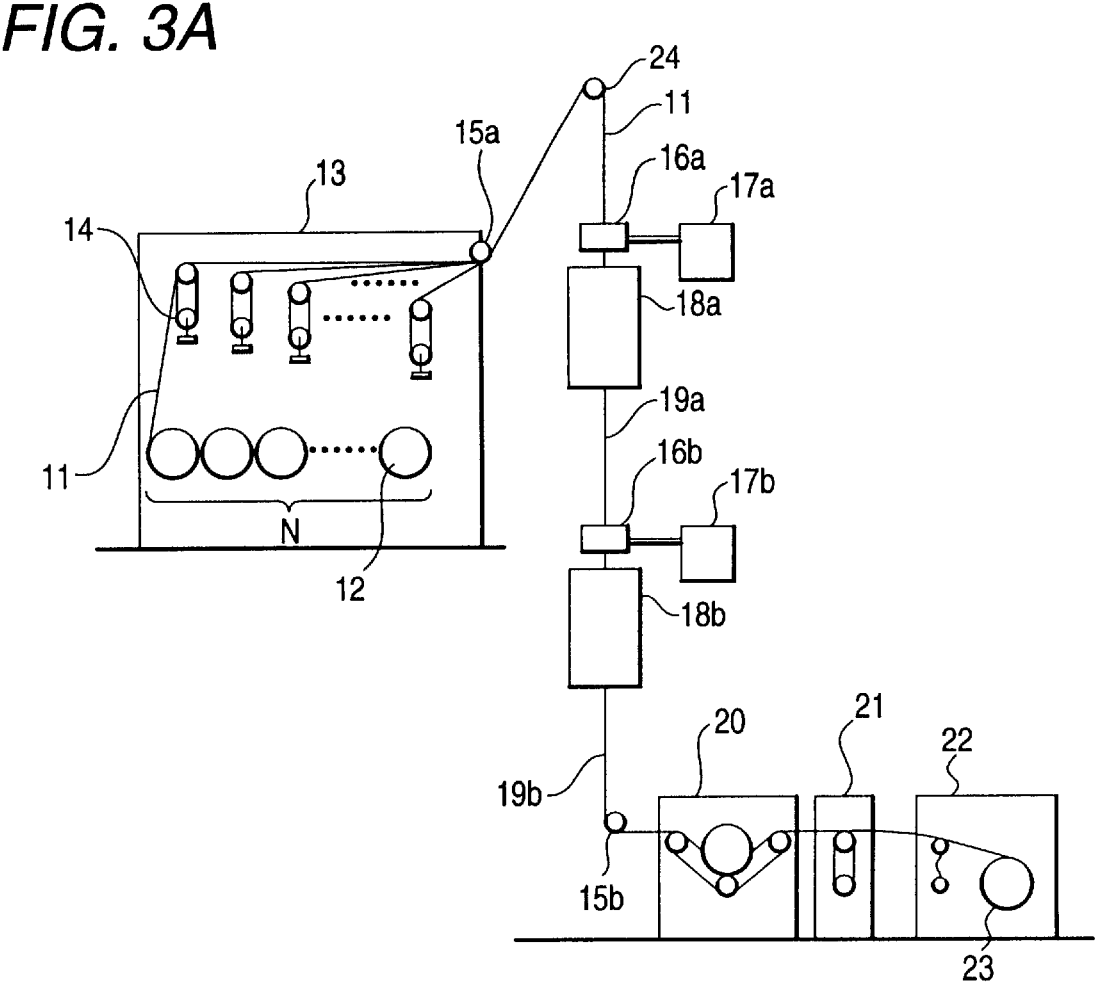
FIG. 3A is a schematic view of an apparatus for producing optical fiber ribbons in a case where two coating layers are provided.
Figure 3B:
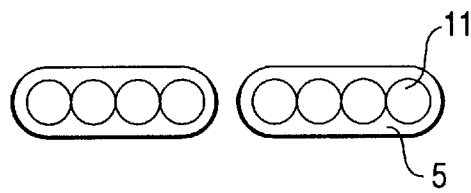
FIGS. 3B and 3C are schematic cross-sectional views explaining coating layers of optical fiber ribbons.
Figure 3C:
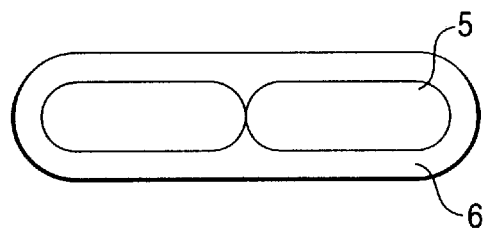

FIG. 3A is a schematic view of an apparatus for producing optical fiber ribbons in a case where two coating layers are provided. FIGS. 3B and 3C are cross-sectional views explaining coating layers of optical fiber ribbons containing plural optical fibers.

In FIGS. 3A to 3C, reference numeral 5 represents an inner coating layer; 6, an outer coating layer; 11, an optical fiber; 12, a bobbin; 13, a supply unit; 14, a dancer roller; 15, a turn roller; 16a, a first coating applicator; 16b, a second coating applicator; 17a and 17b, pressurized resin storage tanks; 18a and 18b, UV irradiators; 19a, optical fiber ribbons (4-fiber optical fiber×2 units) 19b, a separable optical fiber ribbon (8-fiber) ; 20, a capstan; 21, a take-up tension controller; 22, a take-up unit; 23, a bobbin; and 24, an optical fiber gathering device.

Using the apparatus shown in FIG. 3A, a separable optical fiber ribbon containing eight optical fibers is produced in the following manner.

First, eight optical fibers 11 are delivered from a supply unit 13 having eight bobbins 12 around which optical fibers 11 have been wound. The individual optical fibers are given a tension of about several tens of grams by means of dancer rollers 14.

The delivered eight optical fibers 11 are supplied into the optical fiber gathering device 24 so that they are gathered to some extent but adequately spaced apart.

The reasonably gathered eight optical fibers 11 are supplied to the coating applicator 16a as they are arranged in a straight row (perpendicular to the paper on which FIG. 3A is drawn). The coating applicator 16a consists of a die and a nipple each of which has two holes. The optical fibers pass through the coating applicator and the inner coating layer 5 is applied to the optical fibers.

The opening of each nipple is slightly larger than four times the diameter of each optical fiber and as they pass through the nipple, four optical fibers lie side by side without substantial gap. The two holes of the nipple are arranged in a direction perpendicular to the paper and each can let four optical fibers pass.

In the coating applicator 16a, a materiel for the inner coating layer 5 which is made of a UV curable resin is supplied from the pressurized resin storage tank 17a to be applied to the eight optical fibers 11.

As the optical fibers 11 pass through the UV irradiator 18a, the inner coating layer 5 is cured to form two units of 4-fiber optical fiber ribbons 19a.

The two units of 4-fiber optical fiber optical fiber ribbons 19a emerging from the UV irradiator 18a are supplied to the single-hole coating applicator 16b as they are closely arranged in a plane (perpendicular to the paper of FIG. 3A).

In the coating applicator 16b, a material for the outer coating layer 6 which is made of a UV curable resin is supplied from the pressurized resin storage tank 17b to be applied onto the optical fiber ribbons 19a.

As the optical fiber ribbons 19a pass through the UV irradiator 18b, the outer coating layer 6 is cured to form a separable 8-fiber optical fiber ribbon 19b.

The eight optical fibers 11 thus integrated into a ribbon form, that is, the separable 8-fiber optical fiber ribbon 19b, is then passed through the sequence of turn roller 15b, capstan 20 and the take-up tension controller 21 to be taken up by the bobbin 23 in the take-up unit 22. The take-up tension is set at a value from several tens of grams to several hundred grams.

In FIG. 3A, the pass line from the optical fiber gathering device 24 to the turn roller 15b is shown vertical but this is not the sole case of the invention and a horizontal pass line may be substituted.

[III] Structure and Functions of the Alignment Guide of the Invention (i) Structure of the Alignment Guide The apparatus of the invention has an optical fiber gathering device, one or more coating applicators and a turn roller all of which are arranged in a straight line, and further has at least one alignment guide in plate form provided on a travelling line upstream of each the coating applicators, the alignment guide being chamfered to arch form on the side that contacts optical fibers or optical fiber ribbons and the alignment guide suppressing the optical fibers from vibrating in a direction perpendicular to the direction of their arrangement. Here, "on a travelling line" means that the round edge of the alignment guide is on a travelling line of the optical fibers or the optical fiber ribbons or very small clearance is provided between an optical fiber and the edge.

The structure and functions of the alignment guide are described below with reference to FIGS. 4 and 5.

Figure 5A:
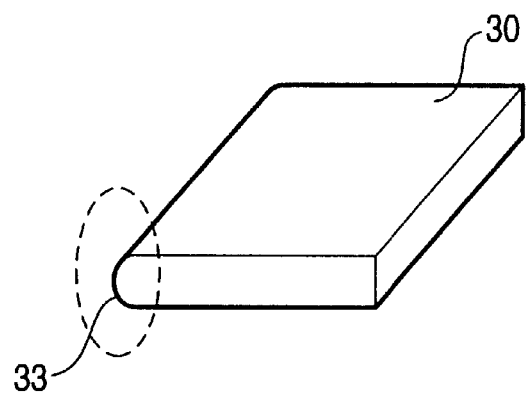
FIG. 5A is a perspective view showing a structure of the alignment guide of the present invention.
Figure 5B:
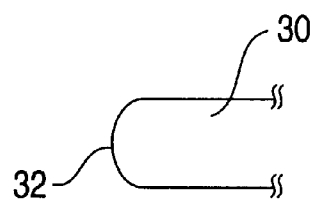
FIG. 5B shows a lateral end of the alignment guide that is coated with a diamond film.
Figure 5C:
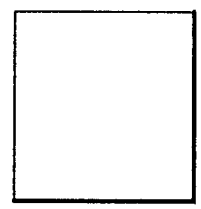
FIG. 5C is a plan view showing the structure of the alignment guide of the present invention.
Figure 5D:
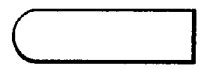
FIG. 5D is a side view showing the structure of the alignment guide of the present invention.
Figure 6A:
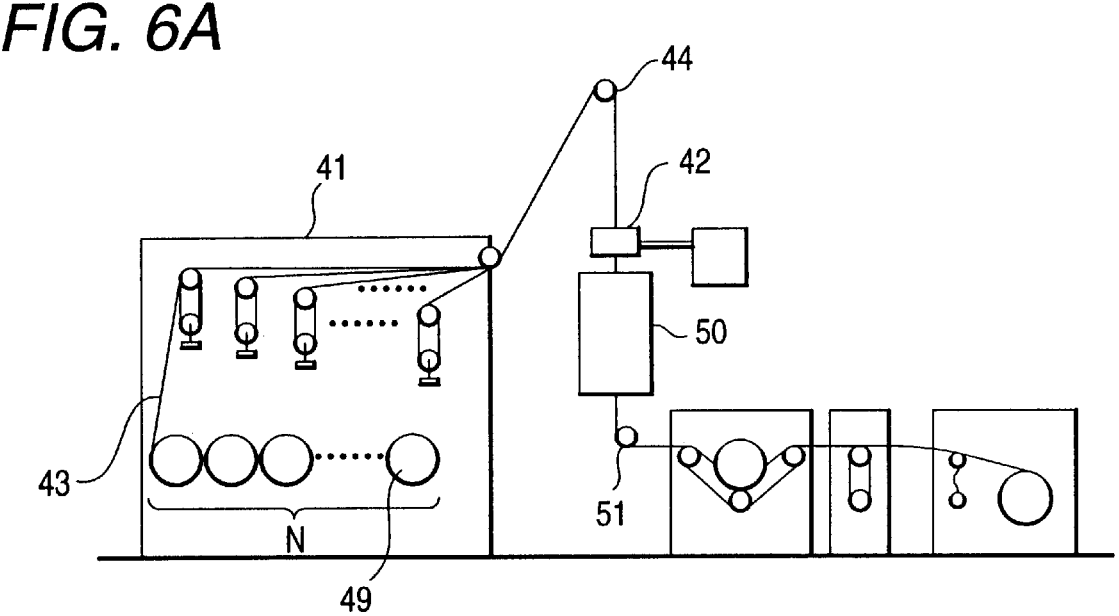
FIGS. 6A and 6B are schematic views of a conventional art mechanism for aligning optical fibers in producing an optical fiber ribbon.
Figure 6B:
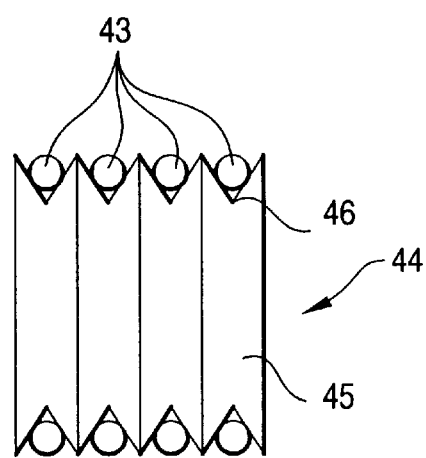
Figure 7A:
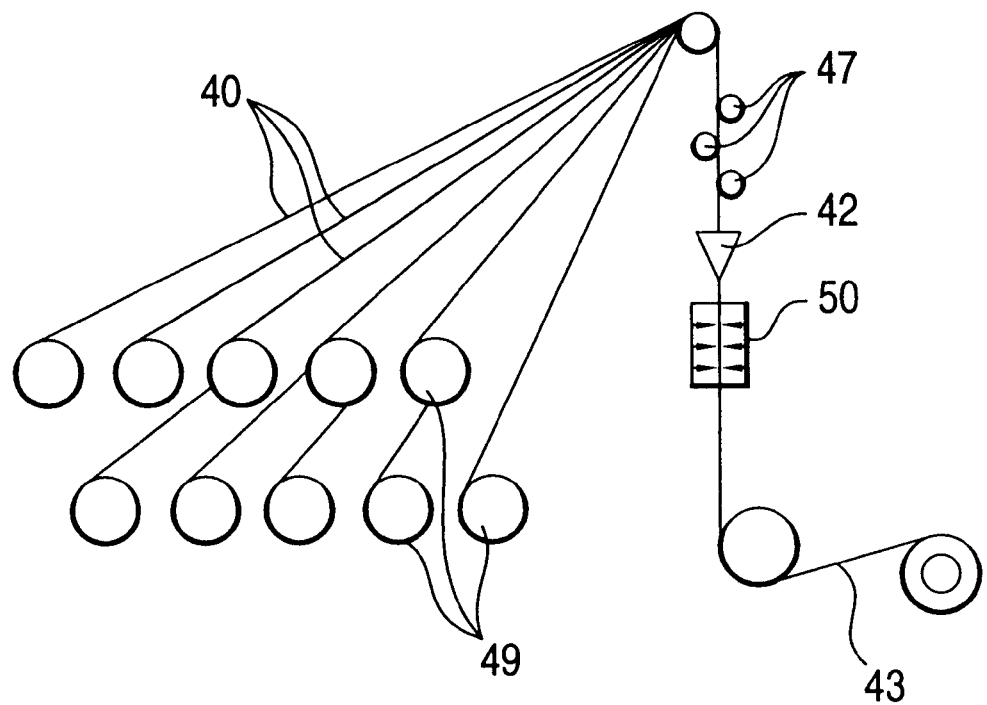
FIGS. 7A and 7B are schematic views of another conventional art mechanism for aligning optical fibers in producing an optical fiber ribbon.
Figure 7B:
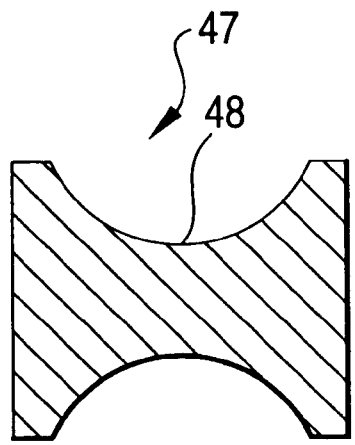

FIGS. 5A to 5D are schematic views showing the structure of the alignment guide of the present invention. FIG. 5A is its perspective view, FIG. 5B shows a lateral end of the alignment guide that is coated with a diamond film, FIG. 5C is its plan view, and FIG. 5D is a side view.

The alignment guide is an element made of a carbon material. As shown in FIG. 5A, it is in plate form and chamfered to arch form on the side 33 that contacts optical fibers or optical fiber ribbons. The side 33 is coated with a diamond film 32 in a thickness of several micrometers by CVD (chemical vapor deposition).

The diamond coating film is deposited for protecting the alignment guide 30 from being abraded by the travelling optical fibers or ribbons and to ensure that the surface asperities resulting from abrasion will not cause secondary damage or any undesired effects on the surfaces of optical fibers or optical fiber ribbons.

The diamond coating film is adapted to have the smallest possible surface roughness and hence will not damage the surfaces of the travelling optical fibers or optical fiber ribbons.

(ii) Location of the Alignment Guide

Figure 4:
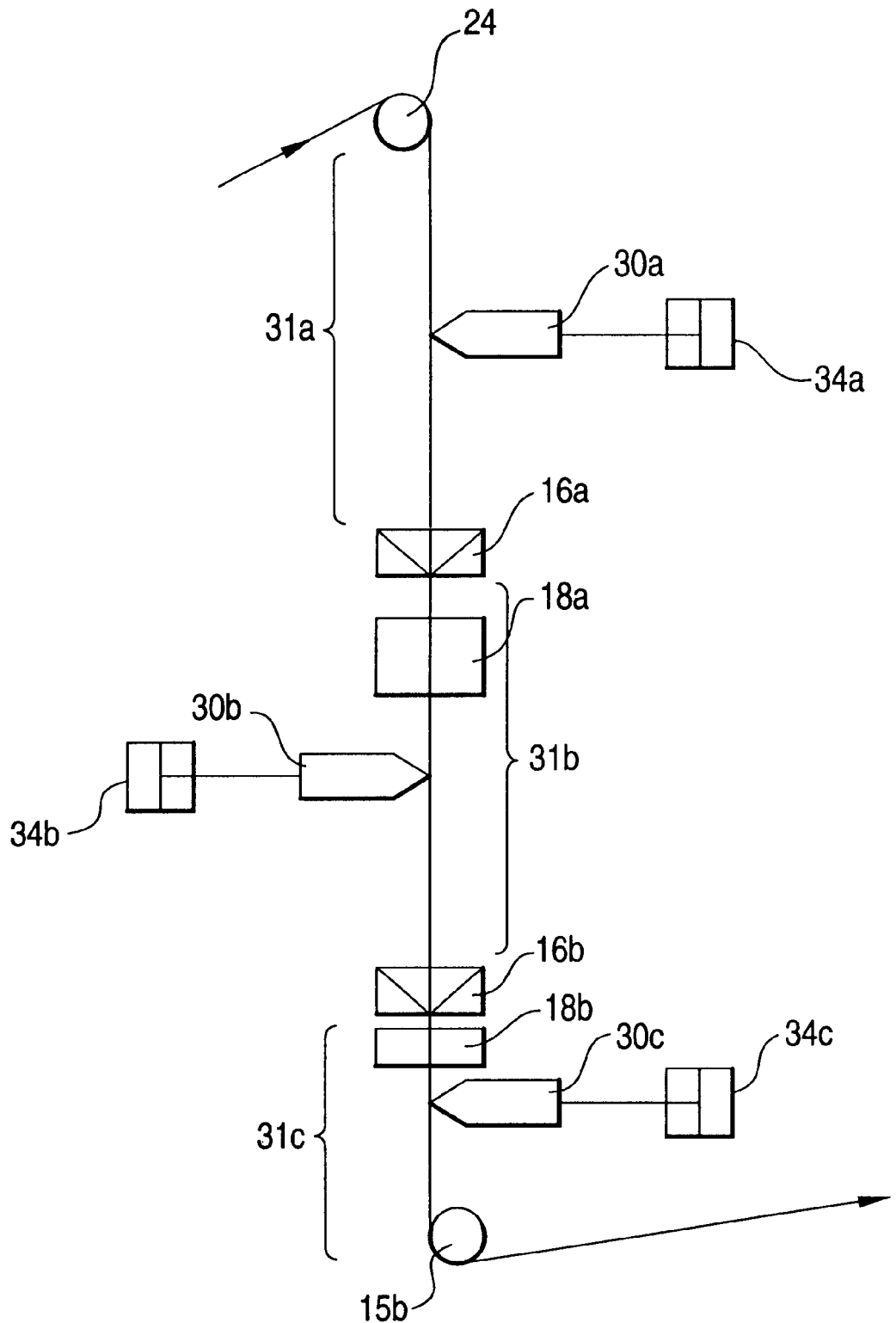
FIG. 4 is a schematic view showing the location of alignment guides.

FIG. 4 shows schematic view showing the location of the alignment guides. According to the present invention, the alignment guide is provided at least on a site that is upstream of the coating applicator. It is preferably located 5 to 10 cm upstream of the coating applicator. In the case shown in FIG. 4, the alignment guide is provided at two sites, (a) between the optical fiber gathering device 24 and the first coating applicator 16a and (b) between the first UV irradiator 18a and the second coating applicator 16b. Preferably, the alignment guide is also provided between the second UV irradiator 18b and the turn roller 15b.

If desired, a very small clearance may be provided between each optical fiber or each optical fiber ribbon and the alignment guide such that the former contacts the latter only when the former is vibrating.

In this way, the alignment guide prevents the optical fibers or optical fiber ribbons from vibrating in a direction perpendicular to the direction of their arrangement.

A plurality of alignment guides may be provided as appropriate for the line length between the optical fiber gathering device 24 and the turn roller 15b.

(iii) Functions of the Alignment Guide

The arch-form side of the alignment guide is situated on or about a travelling line of optical fibers or optical fiber ribbons such that it can suppress occurrence of their vibration. If desired, the alignment guide may be furnished with a mechanism for retracting it to a position that is completely out of the travelling line so that it does not contact optical fibers or optical fiber ribbons. This mechanism may typically employ air cylinders or motor-driven linear motion guides.

The alignment guide is especially effectively used to suppress the planar eccentricity when the line-speed is less than 120 m/min because the linear vibration tends to occur more at such a low line-speed where the self-centering force in the coating die is small.

As shown in FIG. 4, alignment guides 30a, 30b and 30c are respectively furnished with air cylinders 34a, 34b and 34c which move back and forth to achieve effective control over the vibrations in sections 31a, 31b and 31c that would otherwise occur in a direction perpendicular to the travelling line.

In order to ensure that the optical fibers will minimally vibrate in a direction perpendicular to the direction of their arrangement and to substantially prevent the planar eccentricity, the clearance between each optical fiber or optical fiber ribbons and the alignment guide must be kept within 0.2 mm.

For ensuring that optical fibers are arranged in a plane without irregularities, it is effective to adjust the self-centering force that acts on the optical fibers in the tapered portion of the die. In other words, both the self-centering force that acts in the direction of thickness of the optical fiber ribbon in the tapered portion and the self-centering force that acts in the direction of its width have to be adjusted to become maximal.

However, in the case of a die structure that is suitable for stable and uniform application of coatings at high line-speed, the self-centering force that is characteristic of a die decreases particularly with respect to the direction of the thickness of the optical fiber ribbon at a lower line-speed, and hence the vibration of the optical fibers travelling from the optical fiber gathering device toward the turn roller cannot be adequately suppressed by the self-centering force.

In the present invention, even if there occurs a decrease in the self-centering force, the vibration of the optical fibers travelling from the optical fiber gathering device toward the turn roller can be effectively suppressed by the alignment guide of the special structure to ensure that the optical fibers are uniformly arranged in a plane.

The diamond coating film is formed on the surface of the alignment guide, so that the vibration of the optical fibers can be effectively suppressed by the alignment guide without abrasion of the part in contact with the optical fibers or the optical fiber ribbons while preventing both optical fibers and the optical fiber ribbons from being damaged on the surface, eventually ensuring that the optical fibers are uniformly arranged in a plane.

If the alignment guide in plate form is furnished with the mechanism for retracting it from the travelling line, it can be retracted during high-speed operation so that it may not contact with the optical fibers or the optical fiber ribbons. In other words, the alignment guide may only be used during low-speed operation so that occurrence of the planar eccentricity can be prevented.

EXAMPLES

Examples of the present invention are described below with particular reference to a separable 8-fiber optical fiber ribbon. It should, however, be noted that the scope of the invention is by no means limited to these examples.

<Production of Optical fibers>

Single-mode, glass optical fibers having an outside diameter of 125 $\mu$m were coated with two layers of an urethane-acrylate UV curable resin, which in turn were coated with a colored layer of an urethane-acrylate UV curable resin to produce optical fibers having an outside diameter of 250 $\mu$m.

Eight of the optical fibers were set in the supply unit 13 in the apparatus shown in FIG. 3A. The optical fibers 11 were delivered from the supply unit 13 into the coating applicators 16a and 16b so that they were coated with an urethane-acrylate UV curable resin to form an inner coating layer 5 and the outer coating layer 6, respectively. The optical fibers 11 were passed through the UV irradiators 18a and 18b, where they were exposed to UV radiation to cure the inner and outer collective coating layers 5 and 6, whereupon the optical fibers 11 were integrated into a separable 8-fiber optical fiber ribbon 19. The ribbon was taken up at a tension of 150 g.

The optical fiber ribbon was evaluated for the following two parameters, the planar eccentricity of individual optical fibers and the amounts of vibrations that occurred to optical fibers when an alignment guide was placed in specified positions.

To evaluate the uniformity of optical fiber arrangement, the centers of the first and eighth optical fibers at opposite ends of the optical fiber ribbon (see FIG. 2) were connected by a straight line and the distance of other optical fiber's center from the line was measured as the planar eccentricity of optical fiber.

Deterioration in the transmission loss of an optical fiber could be prevented when the planar eccentricity in the optical fiber was no more than 35 μm, preferably no more than 20 μm.

Vibration measurement was performed by an edge method with a laser-based diameter monitor.

The alignment guide of the structure shown in FIGS. 5A to 5D was used.

Example 1

A separable optical fiber ribbon was produced with the alignment guide placed at between an optical fiber gathering device 24 and the first coating applicator 16a, and at between the first UV irradiator 18a and the second coating applicator 16b. The alignment guide was retracted from the pass line at line-speed of 120 m/min and higher. The result is shown in Tables 1 and 2.

Example 2

A separable optical fiber ribbon was produced with the alignment guide placed at three sites, between the optical fiber gathering device 24 and the first coating applicator 16a, between the first UV irradiator 18a and the second coating applicator 16b, and between the second UV irradiator 18b and the turn roller 15b. The alignment guide was retracted from the pass line at line-speed of 120 m/min and higher. The result is shown in Tables 1 and 2.

Comparative Example

A separable optical fiber ribbon was produced by the conventional art method without using the alignment guide.

Tables 1 and 2 summarize the results of the low-speed experiments conducted in the Examples and Comparative Example.

TABLE 1

| | Planar eccentricity of optical fiber (μm) | | | | | |
|---|---|---|---|---|---|---|
| | #2 | #3 | #4 | #5 | #6 | #7 |
| Example 1 | 13 | 11 | 10 | 9 | 10 | 12 |
| Example 2 | 10 | 9 | 8 | 7 | 6 | 9 |
| Comparative Example | 71 | 15 | 20 | 40 | 70 | 51 |

TABLE 2

| | Vibration amount | | | | |
|---|---|---|---|---|---|
| | optical fiber gathering device 24 to coating applicator 16a optical fiber 11 | coating applicator 16a to coating applicator 16b 4-optical fiber optical fiber ribbon 19a | coating applicator 16b to turn roller 15b 8-optical fiber optical fiber ribbon 19b | Remarks | |
| | | | | Alignment guide (vibration damper) | Rating |
| Example 1 | 70 | 40 | 150 | 30a and 30b | good |
| Example 2 | 67 | 40 | 50 | 30a, 30b and 30c | better than Example 1 |
| Comparative Example | 535 | 535 | 750 | none | no satisfactory product obtained |

In Comparative Example, as shown in Table 1, the planar eccentricity of the second to seventh optical fiber that occurred at low speed (<120 m/min) was 71 μm or less. As shown in Table 2, in Comparative Example, the largest vibration of the fibers was 535 μm between the optical fiber gathering device 24 and the first coating applicator 16a, 535 μm between the first coating applicator 16a and the second coating applicator 16b, and 750 μm between the second coating applicator 16b and the turn roller 15b. Because of these high values, the product was by no means satisfactory.

In Example 1, as shown in Table 1, the planar eccentricity of the second to seventh optical fiber occurred at low speed (<120 m/min) was 13 μm or less, a definite improvement as compared with the conventional art was achieved. At high speed (≧120 m/min), the plannar eccentricity was less than one at low speed.

As shown in Table 2, in Example 1, the largest vibration of the fibers that occurred between the first coating applicator 16a and the second coating applicator 16b was 40 μm and the vibration that occurred between the second coating applicator 16b and the turn roller 15b was 150 μm; both values were much smaller than in the conventional art.

In Example 2, as shown in Table 1, the planar eccentricity of the second to seventh optical fiber that occurred at low speed (<120 m/min) was 10 μm or less. At high speed (≧120 m/min), the plannar eccentricity was less than one at low speed.

As shown in Table 2, in Example 2, the largest vibration of the fibers was 67 μm between the optical fiber gathering device 24 and the first coating applicator 16a, 40 μm between the first coating applicator 16a and the second coating applicator 16b, and 50 μm between the second coating applicator 16b and the turn roller 15b; all values were much smaller than in the conventional art and better than in Example 1.

Example 3

The procedure of Example 1 was repeated, except that the alignment guide was not retracted from the pass line during the high-speed operation. Both the results at low speed and at high speed were as satisfactory as in Example 1.

Example 4

The procedure of Example 2 was repeated, except that the alignment guide was not retracted from the pass line during the high-speed operation. Both the results at low speed and at high speed were as satisfactory as in Example 2.

To summarize the foregoing description, the present invention offers the following advantages.

(1) Even if the self-centering force decrease, the alignment guide having the special structure ensures that the optical fibers travelling from the optical fiber gathering device toward the turn roller are effectively suppressed from undergoing vibrations in a direction perpendicular to the direction of their arrangement, whereby the optical fibers are uniformly arranged in a plane.

(2) The diamond coating film optionally provided on the surface of the alignment guide prevents the alignment guide's surface which contact with the optical fibers or the optical fiber ribbons from being abraded, and also the surface of the optical fibers or optical fiber ribbons from being damaged by the surface of the alignment guide which might otherwise be abraded.

(3) The alignment guide may be work during operation at low linear speed but retracted from the travelling line at higher speed so that the optical fibers will not contact the alignment guide on other-than-necessary occasions.

What is claimed is:

1. A method of producing an optical fiber ribbons utilizing an apparatus for producing an optical fiber ribbon, comprising an optical fiber gathering device, one or more coating applicators, and a turn roller, all of which are arranged in a straight travelling line of optical fibers or optical fiber ribbons, and further comprising one or more alignment guides in a plate form which is chamfered to arch form on a side that contacts with said optical fibers or optical fiber ribbons, each alignment guide being positioned upstream of each coating applicator on said travelling line so as to prevent the optical fibers or the optical fiber ribbons from vibration in a direction perpendicular to a direction of arrangement thereof, said method comprising the steps of: suppressing the vibrations occurring in the direction perpendicular to the direction in which the optical fibers or optical fiber ribbons are arranged.

2. The method according to claim 1, further comprising the steps of:

disposing at least one of said alignment guides on said travelling line during operation at low line-speed; and retracting said alignment guides from said travelling line in a high-speed operation.

3. The method according to claim 2, wherein said disposing step comprises disposing at least one of said alignment guides on said travelling line when a line-speed is less than about 120 m/min.

4. The method according to claim 2, wherein said retracting step comprises retracting said alignment guides from said travelling line when a line-speed is greater than about 120 m/min.

5. An apparatus for producing an optical fiber ribbon, comprising:

an optical fiber gathering device;

one or more coating applicators; and a turn roller, all of which are arranged in a straight travelling line of optical fibers or optical fiber ribbons, and further comprising one or more alignment guides in a plate form which is chamfered to arch form on a side adjacent the travelling line of said optical fibers or optical fiber ribbons being positioned upstream of each coating applicator on said travelling line so as to prevent the optical fibers or the optical fiber ribbons from vibration in a direction perpendicular to a direction of arrangement thereof.

6. The apparatus according to claim 5, wherein the alignment guide in plate form has a diamond coating film provided in an area that contacts the optical fibers or optical fiber ribbons.

7. The apparatus according to claim 5, further comprising a mechanism for retracting the alignment guide in plate form to come out of said travelling line.

8. An apparatus for producing an optical fiber ribbon, comprising:

an optical fiber gathering device, one or more coating applicators, and a turn roller arranged to dispose optical fibers or optical fiber ribbons borne thereby in a substantially straight line between said optical fiber gathering device and said turn roller; and an alignment guide positioned immediately adjacent the optical fibers disposed in said substantially straight line between said optical fiber gathering device and said turn roller, wherein said alignment guide is positioned to form a gap between the optical fibers or optical fiber ribbons and the alignment guide, and wherein said gap corresponds in width to an amount less than or equal to an amplitude of vibration of said optical fibers or optical fiber ribbons at a point immediately adjacent said alignment guide.

9. An apparatus for producing an optical fiber ribbon according to claim 8, wherein said gap is less than about 0.2 mm.

* * * * *